United States Patent [19]

Ohe et al.

[11] Patent Number: 4,580,649
[45] Date of Patent: Apr. 8, 1986

[54] POWER STEERING APPARATUS

[75] Inventors: Takeshi Ohe; Hiroshi Ohsaki, both of Higashimatsuyama, Japan

[73] Assignee: Jidosha Kiki Co., Ltd., Tokyo, Japan

[21] Appl. No.: 649,443

[22] Filed: Sep. 11, 1984

[30] Foreign Application Priority Data

Sep. 24, 1983 [JP] Japan ................... 58-176622

[51] Int. Cl.$^4$ ............................. B62D 5/04
[52] U.S. Cl. ..................... 180/79.1; 318/15; 318/491
[58] Field of Search ............. 180/79.1; 318/15, 480, 318/491

[56] References Cited

U.S. PATENT DOCUMENTS 4,020,918  5/1977  Houskamp ............. 180/79.1 X
4,241,804  12/1980  Deininger ............. 180/79.1

FOREIGN PATENT DOCUMENTS

2507142  6/1981  France .
33327    1/1967  Japan .
35035    3/1977  Japan ................. 180/79.1
102727   8/1979  Japan .
47963    4/1980  Japan .
76760    6/1980  Japan ................. 180/79.1
47251    3/1982  Japan ................. 180/79.1

Primary Examiner—Robert G. Nilson
Attorney, Agent, or Firm—Townsend & Townsend

[57] ABSTRACT

A vehicle power steering apparatus for performing power steering by rotating a motor in accordance with a steering torque acting on input and output steering shafts and driving a steering direction control unit to perform power steering, comprises a sensor for generating an electrical signal corresponding to a displacement of a movable member displaced by a rotational force acting on the steering wheel; a controller for rotating the motor at a torque represented by the electrical signal during an ON time of the electrical signal generated from the sensor; and moving means for moving the movable member in a direction to cancel the displacement of the movable member driven by the motor.

4 Claims, 12 Drawing Figures

POWER STEERING APPARATUS

BACKGROUND OF THE INVENTION

The present invention relates to a power steering apparatus which can be mounted in any type of vehicle to decrease a steering force needing to be exerted by a driver.

Light-operated power steering apparatuses have become widespread recently. Such a conventional power steering apparatus uses electrical energy supplied from a battery. In this conventional power steering apparatus, the electrical energy causes a motor to operate an oil pump. Compressed oil from the pump is supplied to a power steering section to perform steering with a small force.

However, in this conventional power steering apparatus, a means for controlling a oil flow rate controlled by motor rotation and for preventing oil leakage becomes complicated, resulting in high cost and low reliability.

In order to eliminate the conventional drawbacks, a power steering apparatus is proposed in Japanese Patent Disclosure No. 55-47,963, wherein a steering unit is directly driven by a motor. Since the speed of the motor is high, the motor cannot follow a great change in steering direction. In particular, when quick turns of a steering wheel for slalom-like driving are required, the automatic steering apparatus cannot provide a sufficient performance.

Another conventional power steering apparatus is proposed in Japanese Patent Disclosure No. 46-33,327, wherein an electromagnetic clutch is constituted by two main driving members rotated in opposite directions and one driven member connected to a steering mechanism. The driven member is coupled to any one of the main driving members, thereby controlling the steering mechanism. However, the clutch generates large sliding noise, thereby discomforting the driver. In addition, the clutch is easily worn, so increasing maintenance operation and degrading reliability.

In a conventional power steering apparatus which does not use oil, the steering unit must be operated by an amount corresponding to a steering torque. Although steering torque detection is performed by a strain gauge, the strain gauge has low reliability and low sensitivity. Thus, the strain gauge is not suitable in the steering apparatus of a vehicle which requires high sensitivity.

SUMMARY OF THE INVENTION

It is an object of the present invention to solve the conventional problems and provide a power steering apparatus using a motor rotational force as a direct steering force.

In order to achieve the above object of the present invention, there is provided a vehicle power steering apparatus for performing power steering by rotating a motor in accordance with a steering torque acting on input and output steering shafts and driving a steering direction control unit to perform power steering, comprising:

a sensor for generating an electrical signal corresponding to a displacement of a movable member displaced by a rotational force acting on the steering wheel;

a controller for rotating the motor at a torque represented by the electrical signal during an ON time of the electrical signal generated from the sensor; and moving means for moving the movable member in a direction to cancel the displacement of the movable member driven by the motor.

DETAILED DESCRIPTION OF THE PREFERRED EMBODIMENTS

Figure 1:
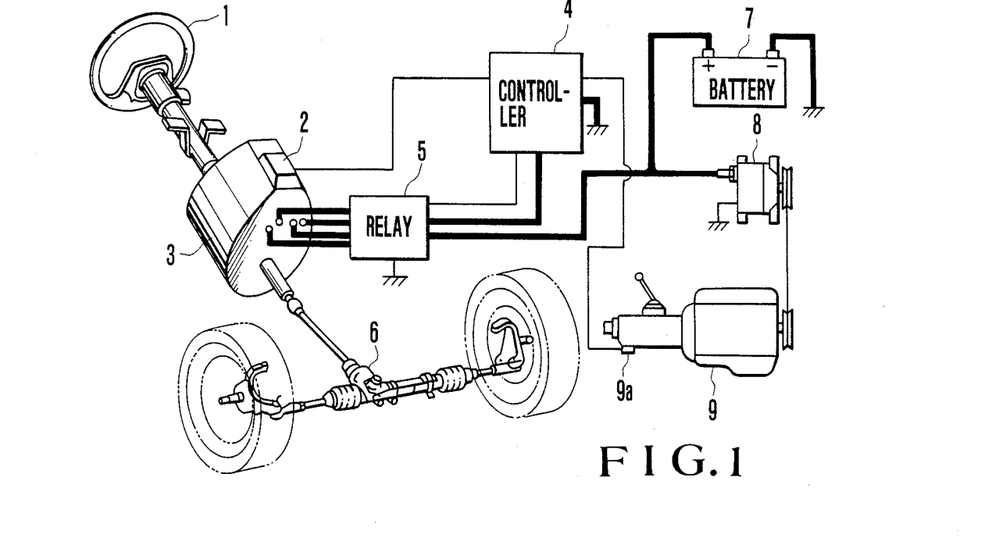
FIG. 1 is a block diagram of a power steering apparatus according to an embodiment of the present invention.

FIG. 1 shows an overall system configuration of a power steering apparatus according to an embodiment of the present invention. Referring to FIG. 1, reference numeral 1 denotes a steering wheel; 2, a torque sensor; 3, a power steering section; 4, a controller; 5, a relay; 6, a steering direction control unit; 7, a battery; 8, an alternator; 9, an engine; and 9a, a vehicle speed sensor.

Figure 2:
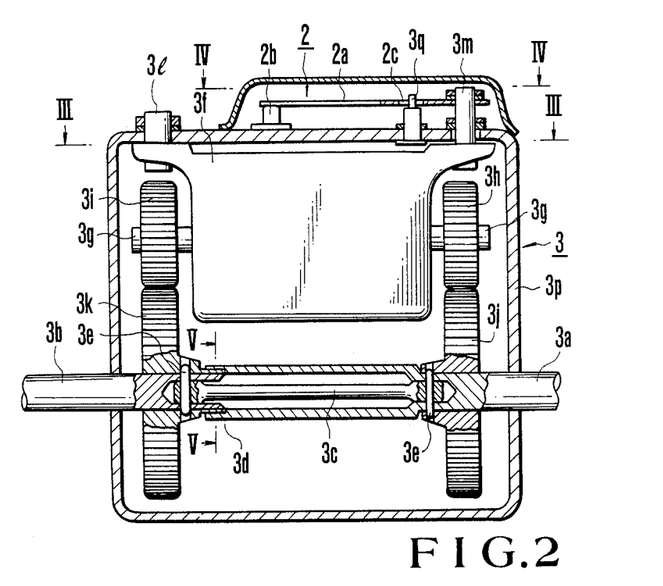
FIG. 2 is a sectional view of a power steering section 3 in FIG. 1.
Figure 3:
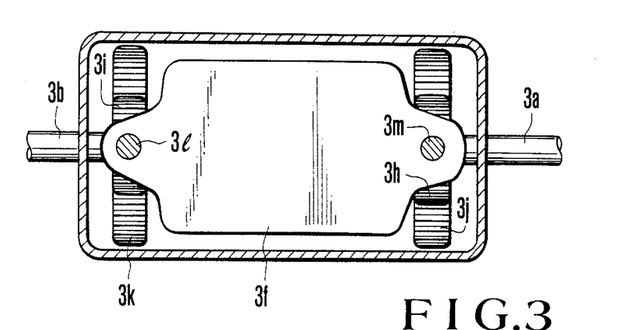
FIGS. 3, 4 and 5 are sectional views of the power steering section 3 of FIG. 2 taken along the lines III—III, IV—IV and V—V, respectively.
Figure 4:
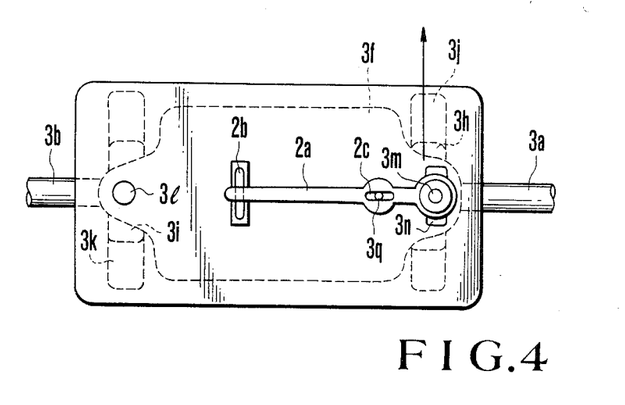
Figure 5:
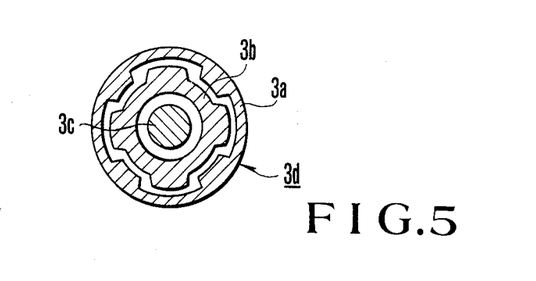

FIG. 2 is a sectional view of the torque sensor 2 and the steering section 3; FIGS. 3, 4 and 5 are sectional views thereof taken along the lines III—III, IV—IV and V—V, respectively. Referring to FIGS. 2 to 5, reference numeral 3a denotes an input steering shaft; 3b, an output steering shaft; 3c, a torsion bar; and 3d, a fail safe stopper. A rotational force of the steering wheel 1 is transmitted to the input steering shaft 3a. A rotational force of the output steering shaft 3b is transmitted to the steering direction control unit 6. One end of the torsion bar 3c is fixed by two pins 3e on the input steering shaft 3a, and the other end thereof is fixed on the output steering shaft 3b. As shown in FIG. 5, the fail safe stopper 3d is arranged such that the input steering shaft 3a is not brought into contact with the output steering shaft 3b. The input and output steering shafts 3a and 3b can be relatively rotated through the torsion bar 3c within a predetermined steering angle range. However, when a steering angle exceeds the predetermined range, the projections of the input and output steering shafts 3a and 3b abut against each other, so that rotation of one steering shaft is transmitted to the other steering shaft. Reference numeral 3f denotes a motor. Rotating shafts 3g of the motor 3f extend from the two ends of the motor 3f, respectively. Gears 3h and 3i are integrally mounted on the rotating shafts 3g and are rotated therewith, respectively. The gear 3h meshes with a gear 3j, and the gear 3i meshes with a gear 3k. The gear 3j is mounted on the input steering shaft 3a and is rotated therewith, and the gear 3k is mounted on the output steering shaft 3b and is rotated therewith. The motor 3f is mounted in a case 3p while the motor 3f is supported by support shafts 3l and 3m. The support shaft 3l is mounted in the case 3p while the shaft 3m is slidably inserted in a groove 3n, as shown in FIG. 4. The support shaft 3l is mounted in the case 3p such that the motor 3f is pivoted. Reference numeral 2a denotes a slider. One end of the slider 2a is pivotally mounted on the support shaft 3m, and the other end thereof constitutes a free end, so that the slider 2a can be slid on a resistive element 2b. A groove 2c is formed in the slider 2a at a position in the vicinity of the support shaft 3m. A support shaft 3q fixed to the case 3p is slidably inserted in the groove 2c. A change in resistance caused by a displacement of the slider 2a is transmitted to the controller 4 shown in FIG. 1. The controller 4 causes the motor 3f to rotate in accordance with the change in resistance. In this case, the motor 3f is not rotated while the input and output steering shafts 3a and 3b are located on the same level (FIG. 4) as the slider 2a. The rotational direction is determined by a direction in which the slider 2a is deviated from the input and output steering shafts 3a and 3b, and the rotational torque is determined by a deviation. The slider 2a and the resistive element 2b constitute a torque sensor 2.

The operation of the power steering apparatus having the construction described above will be described hereinafter. When the driver turns the steering wheel 1, the input steering shaft 3a is rotated. Assume that the input steering shaft 3a is slightly rotated (e.g., by an angle of about 10°). Since the gear 3j is rotated together with the input steering shaft 3a, the gear 3j is rotated through the same rotational angle as the input steering shaft 3a. The rotational force of the gear 3j is transmitted to the gear 3k through the gear 3i mounted at the opposite side to the gear 3h and the shaft 3g. The output steering shaft 3b rotated together with the gear 3i drives the steering direction control unit 6. Therefore, a large force is required for rotation with a large torque. When a rotational force exceeding a given value acts on the input steering shaft 3a, the torsion bar 3c is twisted to rotate the input steering shaft 3a and the gear 3j although the output steering shaft 3b and the gear 3k are not rotated. As a result, the gear 3h orbits around the input steering shaft 3a, and thus the motor 3f is pivoted about the support shaft 3l in a direction (indicated by an arrow in FIG. 4) toward the lower surface of the drawing.

Upon pivotal movement of the motor 3f, the slider 2a is pivoted about the support shaft 3q. The slider 2a is slid along the resistive element 2b, and a resistance change signal is generated from the slider 2a. In this case, when a distance between the support shafts 3m and 3q is shorter than that between the support shaft 3q and the resistive element 2b, a displacement of the slider 2a on the resistive element 2b is magnified as compared with pivotal movement of the motor 3f.

When the resistance change signal is supplied to the controller 4 shown in FIG. 1, the controller 4 causes the shaft 3g of the motor 3f to rotate at a speed corresponding to the resistance change. The gears 3h and 3i are rotated from the right to left in FIG. 4 (the rotational direction is viewed from the right side of the drawing, unless otherwise specified). The rotational force of the gears 3h and 3i is transmitted to the gear 3k, so that the output steering shaft 3b is rotated in the same direction (the right-hand direction) as the steering wheel 1. The rotational force of the output steering shaft 3b is transmitted to the steering direction control unit 6, and the vehicle can be turned in the direct-hand direction. In this case, a force required for turning the steering wheel 1 comprises a force for pivoting the motor 3f about the support shaft 3l. In other words, only a force for twisting the torsion bar is required. An actual steering direction force is obtained by the torque from the motor 3f.

When the motor 3f is rotated in the left-hand direction under the control of the controller 4, the gear 3h is rotated in the same direction as the motor 3f. Meanwhile, the steering wheel 1 is supported by the driver, and so the gear 3j will not rotate even if the gear 3h is rotated. For this reason, a force directed toward the upper surface of the drawing (FIG. 2) acts on the motor 3f, so that the motor 3f is pivoted about the support shaft 3. The slider 2a is then aligned with the input and output steering shafts 3a and 3b. A portion of the slider 2a which is in contact with the resistive element 2b is located in the position prior to steering. In this case, the controller 4 cuts off a current from the motor 3f, so that the motor 3f is stopped. When the driver further turns the steering wheel 1, the output steering shaft 3b is rotated in the same direction as that of the steering wheel 1, so that an angular displacement is increased.

When a vehicle is turned or rotated at a given steering angle in a steady circular turn or the like, a reaction force acts from the wheels to the steering wheel. This reaction force causes the output steering shaft 3b to transmit a rotational force to the gears 3i and 3h. However, since a force acts from the steering wheel 1 held by the driver to the input steering wheel 3a, the gear 3j will not rotate. As a result, the torsion bar 3c is twisted and the gear 3h orbits around the gear 3j. For this reason, an output is generated from the torque sensor 2, and the motor 3 continuously generates a torque, thereby continuing power steering. When the driver releases the force to change turning of the vehicle to straight travel, the output steering shaft 3b is rotated by a reaction force from the wheels in an opposite direction. This rotational force is transmitted to the gears 3k, 3i, 3h and 3j. The input steering shaft 3a is rotated in the opposite direction, and the steering wheel 1 then returns to the state prior to steering.

The above description has been made for turning right. However, the same operation as in turning right is applied to turning left. Even if the motor 3f or the controller 4 is broken to disable the motor 3f, the rotational force of the input steering shaft 3a can be transmitted by the fail safe stopper 3d (FIG. 5) to the output steering wheel 3b.

A maximum rotation speed of the steering shafts 3a and 3b is about two revolutions/second, and thus the speed of the motor 3f can be four revolutions/second, i.e., 240 rpm. A series motor is suitable to obtain a high torque at a low speed. This motor does not employ a permanent magnet for generating a magnetic field. The rotor can therefore be smoothly rotated in the OFF time. When the vehicle changes from turning to straight travel, the steering wheel can be smoothly moved in the same manner as in conventional power steering. Furthermore, since the speed of the motor 3f is lowered, the motor can follow quick and repeated turning of the steering wheel. Unlike the conventional power steering apparatus which is directly driven by the motor, a response delay will not occur even in slalom-like driving. In addition, the steering force is detected by the torsion bar and the electric resistor, resulting in high reliability. If a noncontact type distortion meter is used in place of the electric resistor, a still higher reliability can be obtained.

Figure 6:
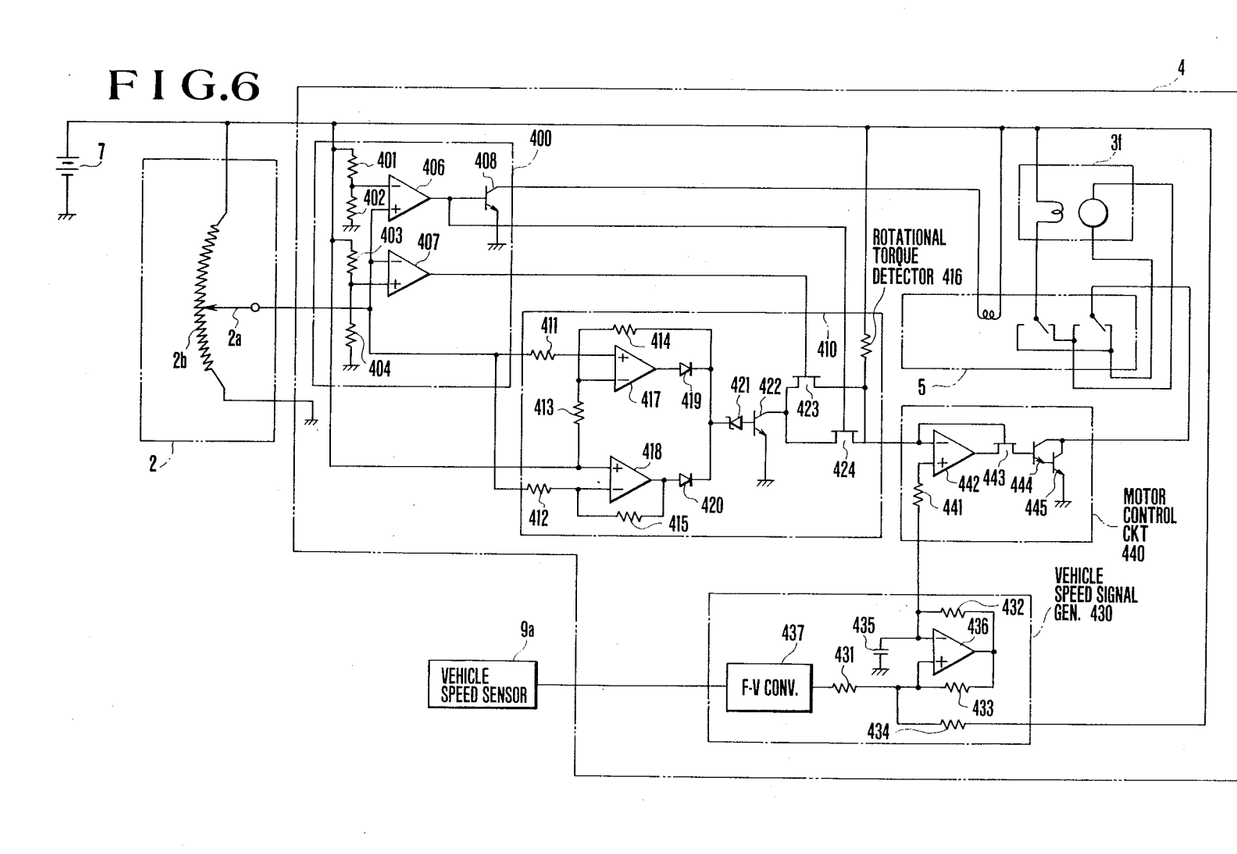
FIG. 6 is a circuit diagram of a controller 4 shown in FIG. 1.

The electric circuit of the power steering section 3 is shown in FIG. 6. The same reference numerals as in FIG. 6 denote the same parts as in FIGS. 1 to 4. Referring to FIG. 6, the controller 4 comprises a rotational direction detector 400 for detecting a rotational direction of the input steering shaft 2a, a rotational torque detector 410 for detecting a rotational torque of the input steering shaft 2a, a vehicle speed signal generator 430 for generating a signal which has a smaller magnitude when a vehicle speed is increased in response to the signal from the vehicle speed sensor 9a, and a motor control circuit 440 for multiplying signals from the rotational torque detector 410 and the vehicle signal generator 430 and for controlling to stop the motor 3f when power steering is not performed and to increase the torque of the motor 3f when a sreering torque becomes higher or a vehicle speed becomes lower. The vehicle speed signal generator 430 and the motor control circuit 440 constitute a rotational torque control circuit. The relay 5 constitutes a means for controlling the rotational direction of the motor 3f in response to an output signal from the rotational direction detector 400.

The rotational direction detector 400 comprises resistors 401 to 404, comparators 406 and 407 and a transistor 408. The rotational torque detector 410 comprises resistors 411 to 416, operational amplifiers (to be referred to as op amps hereinafter) 417 and 418, diodes 419 and 420, a Zener diode 421, a transistor 422, and FETs 423 and 424. A Zener voltage of the Zener diode 421 is selected to be substantially ½ of a voltage V of the battery 7. The vehicle speed signal generator 430 comprises resistors 431 to 434, a capacitor 435, an op amp 436 and an F-V converter 437 for decreasing an output voltage when the number of pulses of an input signal is increased. The motor control circuit 40 comprises a resistor 441, a comparator 442, an FET 443 and transistors 444 and 445.

Figure 7:
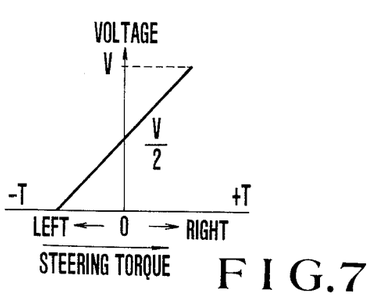
FIGS. 7 to 10 are graphs showing output voltages from operational amplifiers 417 and 418 and a rotational torque detector 410 in a steering state, and a timing chart showing an output signal from a vehicle speed signal generator 430 when a vehicle speed changes, respectively.

The circuit arranged described above is operated as follows. In the torque sensor 2, the slider 2a is located at the ground position side when the the battery 7 is connected across the resistive element 2b and the steering wheel 1 is rotated in he left-hand direction. However, when the steering wheel 1 is rotated in the left-hand direction, the slider 2a is moved to the power supply side. If the rotating angle of the steering wheel 1 in the right-hand direction is defined to be positive, a voltage generated from the slider 2a upon rotation of the steering wheel 1 becomes V/2 in the nonsteering mode as shown in FIG. 7, a voltage which is higher than the voltage V/2 for turning right, and a voltage which is lower than the voltage V/2 for turning left.

A voltage generated in accordance with a given steering state is supplied to a noninverting input terminal of the comparator 406 in the rotational direction detector 400 and an inverting input terminal of the comparator 407. However, when the nonsteering mode is set, resistances of the resistors 401 to 404 are selected such that the comparators 406 and 407 generate signals of logic "0". With this arrangement, since the voltage from the slider 2a in the right steering mode becomes higher than that in the nonsteering mode, the voltage at the noninverting input terminal of the comparator 406 becomes higher than that at the inverting input terminal thereof, so that the comparator 406 generates a signal of logic "1". In the left steering mode, the voltage at the noninverting input terminal of the comparator 407 becomes lower than that at the noninverting input terminal thereof, so that the comparator 407 generates a signal of logic "1". Output signals from the comparators 406 and 407 are supplied to the FETs 423 and 424, respectively. The FET 424 is turned on in the right steering mode, and the FET 423 is turned on in the left steering mode.

The voltage generated from the slider 2a is supplied to the rotational torque detector 410 as well as the comparators 406 and 407. In the rotational torque detector 410, when the op amps 417 and 418 are adjusted to have constants to generate voltages which are ½ of the power supply voltage in the nonsteering mode, the voltage from the torque sensor 2 in the right steering mode is increased. The op amp 417 increases an output voltage in accordance with an increase in steering torque, as indicated by the solid line in FIG. 8. A collector voltage of the transistor 422 decreases in accordance with an increase in base voltage, i.e., an increase in steering torque. In this case, the op amp 418 generates a voltage which decreases in response to an increase in steering torque, as indicated by an alternate long and short dashed line in FIG. 8, so that the operation of the op amp 417 will not be influenced. In this case, the comparator 406 in the rotational direction detector 400 generates a signal of logic "1", so that the FET 424 is kept ON, and a change in collector voltage of the transistor 422 is applied to the motor control circuit 440.

Figure 8:
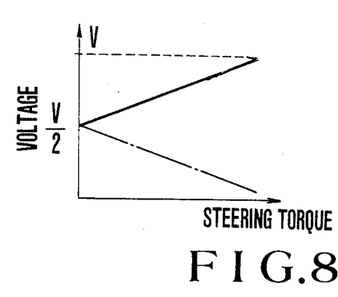

In the left steering mode, a voltage generated from the torque sensor 2 decreases, and thus the op amp 418 in the rotational torque detector 410 decreases, as indicated by the solid line in FIG. 8. Therefore, the transistor 422 shows the characteristics shown in FIG. 9. An output signal from the transistor 422 is supplied to the motor control circuit 440 through the FET 423.

The vehicle sensor 9a generates a signal having a larger number of repeated pulses when a vehicle speed is increased. The F-V converter 437 generates a lower voltage when the number of input pulses is increased. The noninverting input terminal of the op amp 436 receives a signal whose voltage decreases in accordance with an increase in vehicle speed. A voltage at the inverting input terminal of the op amp 436 has a triangular wave having a high amplitude when a vehicle speed is low. However, when a vehicle speed becomes high, the triangular wave has a low amplitude.

Figure 9:
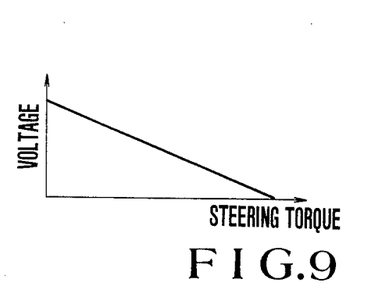
Figure 10:
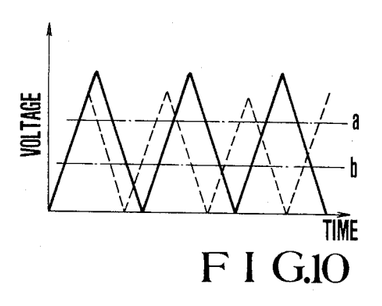

This triangular signal is supplied to the motor control circuit 440 together with the signal which has the characteristic shown in FIG. 9 and which is generated from the rotational speed detector 410. The FET 443 is kept OFF in the nonsteering mode, and the motor control circuit 440 does not generate the output signal. As a result, the motor 3f does not rotate. When a steering operation of small torque is performed, a voltage supplied to the noninverting terminal of the comparator 442 is high, as indicated by the alternate long and short dashed line a in FIG. 10. The comparator 442 generates a pulse having a small duty ratio. However, when the steering torque becomes large, a voltage applied to the noninverting input terminal of the comparator 442 becomes low, as indicated by the alternate long and short dashed line b. In this case, the comparator 442 generates a signal having a high duty ratio. When the duty ratio is small, i.e., when the steering torque is small, an average value of output signals from the comparator 442 becomes small, and the rotational torque of the motor 3f becomes small. At the same time, the steering force magnification is also small. However, when the steering torque is large, the rotational torque of the motor 3f becomes large and the steering force magnification becomes large. Even if the vehicle speed changes while a predetermined steering torque is given, the same operation as described above can be performed. More particularly, when a vehicle speed is low, the rotational torque of the motor 3f becomes large. However, when the vehicle speed is high, the rotational torque of the motor 3f becomes small.

The rotational direction of the motor 3f is determined such that the motor 3f is rotated in the left direction upon the steering wheel 1 turning left. When the steering wheel 1 is turned in the right-hand direction, the transistor 408 in the rotational direction detector 400 is turned on to energize the relay 5. The direction of a current flowing through the motor 3f is reversed, and the rotational direction of the motor 3f is reversed to perform right turning.

Figure 11:
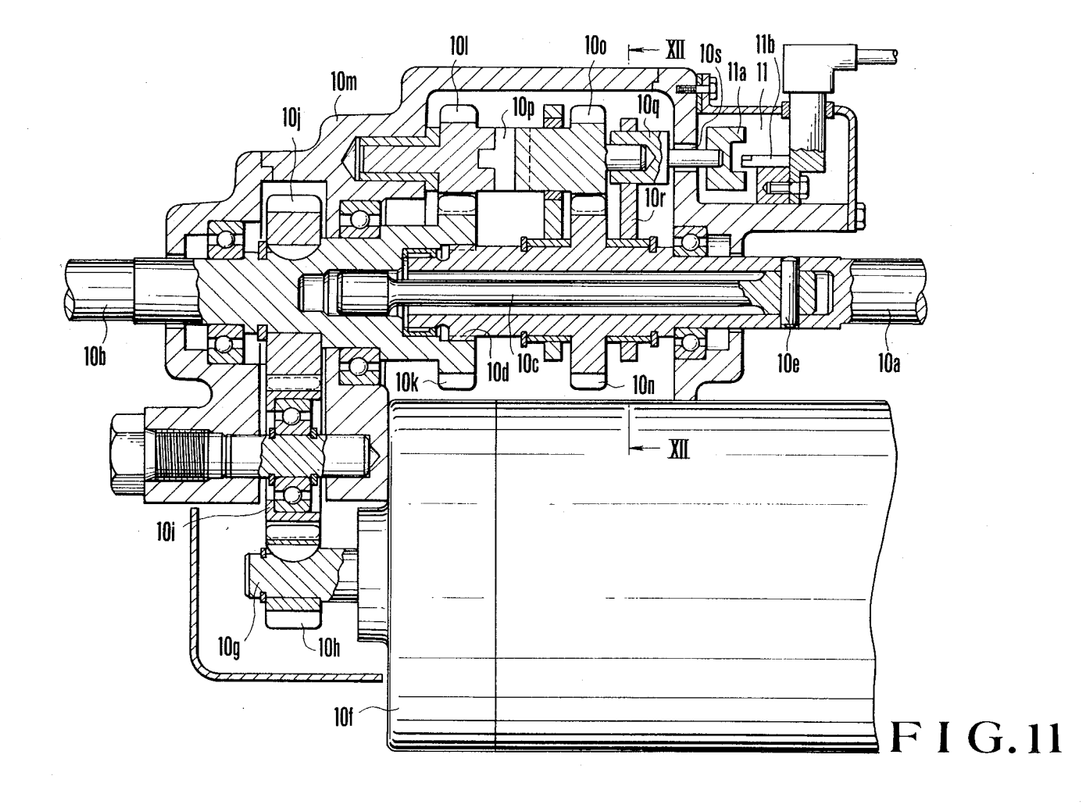
FIG. 11 is a sectional view showing another embodiment of a power steering section 3 shown in FIG. 1.
Figure 12:
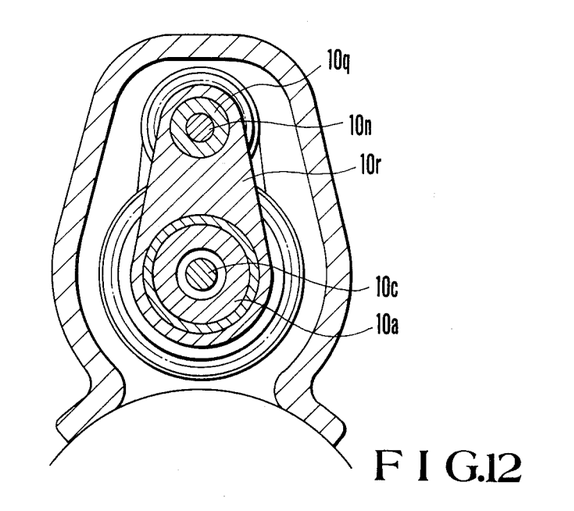
FIG. 12 is a sectional view of the power steering section 3 taken along the line XII—XII in FIG. 11.

FIG. 11 is a sectional view of a power steering section 10 and a torque sensor 11 of a power steering apparatus according to another embodiment of the present invention. Referring to FIG. 11, reference numeral 10a denotes an input steering shaft; 10b, an output steering shaft; 10c, a torsion bar; and 10d, a fail safe stopper. The rotational force of the steering wheel 1 is transmitted to the input steering shaft 10a, and a rotational force of the output steering shaft 10b is transmitted to a steering direction control unit 6. One end of the torsion bar 10c is fixed by a pin 10e on the input steering shaft 10a, and the other end thereof is urged and inserted in a recess of the output steering shaft 10b, so that the torsion bar 10c is rotated together with the output steering shaft 10b. Reference numeral 10f denotes a motor; and 10g, a rotating shaft. A gear 10h is fixed on the rotating shaft 10g to be rotated together therewith. The gear 10h drives through the gear 10i a gear 10j rotated together with the output steering shaft 10b. In the end portion of the output steering shaft 10b which is located on the side of the torsion bar 10c, a gear 10k is integrally formed with the output steering shaft 10b. The gear 10k meshes with a gear 10l. A portion of the gear 10l on the side of the output steering shaft 10b is rotatably inserted in a recess of a housing 10m. A gear 10n is formed integrally with the input steering shaft 10a and meshes with a gear 10o. One end portion of the gear 10o which is located at the side of the gear 10l is coupled to the gear 10l through an Oldham's coupling 10p. The other end portion of the gear 10o is rotatably inserted in a recess of a movable member 10q. A portion of the movable member 10q which is not engaged with the gear 10o extends away therefrom. A concave-shaped sensor element 11a is fixed at the distal end thereof. A portion of the movable member 10q which is engaged with the gear 10o is rotatably inserted in a support plate 10r, as shown in FIG. 12, which is a sectional view taken along the line XII—XII in FIG. 11. The support plate 10r is pivotally fitted with the input steering shaft 10a. An elongated aperture 10s is formed in the housing 10m along the upper-to-lower-surface direction of the drawing, and the movable member 10q can be moved along the same direction. Reference numeral 11b denotes a sensor element fixed on the housing 10m and extending into the recess of a sensor element 11a. The sensor elements 11a and 11b constitute the torque sensor 11.

The power steering apparatus having the construction described above is operated in the following manner. When the driver turns the steering wheel 1 in the right-hand direction, the input steering shaft 10a is rotated in the right-hand direction. A rotational force from the input steering shaft 10a is transmitted to the gear 10k through gears 10n, 10o and 10l. Since the gear 10k drives the steering direction control unit 6 through the output steering shaft 10b, the gear 10k has a large load. The torsion bar 10c is twisted to generate a relative rotational displacement of the input and output steering shafts 10a and 10b. The gears 10n and 10k are subjected to the same rotational displacement as in the input and output steering shafts 10a and 10b and are slid along the Oldham's coupling 10p and pivoted about the input steering shaft 10a in the lower-surface direction of the drawing. The movable member 10q inserted in the shaft of the gear 10o is moved together with the gear 10o. The torque sensor 11 generates an electrical signal corresponding to a displacement of the sensor element 11a. This signal is supplied to the controller 4 and causes the motor 10f to rotate in response to the sensor output. In this case, the motor 10f is arranged to rotate from the right to the left when viewed from the right side of the drawing (rotation is viewed from the right side of the drawing, unless otherwise specified). A rotational force is transmitted to the gear 10j through the gear 10i, so that the output steering shaft 10b is rotated in the right-hand direction. The output steering shaft 10b is rotated in the same direction as that of the input steering shaft 10a to control the steering direction control unit 6, thereby causing of the vehicle to turn right.

When the output steering shaft 10b is rotated in the right-hand direction, the gear 10k formed integrally therewith is also rotated in the right-hand direction. The rotational force of the gear 10k is transmitted to the gear 10o through the Oldham's coupling 10p. The gear 10o meshes with the gear 10n rotated together with the input steering shaft 10a. Since the input steering shaft 10a is supported by a force acting on the steering wheel 1, the gear 10n will not be rotated by the rotational force transmitted by the gear 10o. Instead, the gear 10o is moved from the lower surface of the drawing to the upper surface thereof along the peripheral surface of the gear 10n. When the axis of the gear 10l is aligned with that of the gear 10o, and the sensor element 11a returns to the initial position, the torque sensor 11 will not generate a signal. Subsequently, the motor 10f is stopped, and the respective gears interlocked therewith are also stopped.

When the vehicle is completely turned, and the force having acted on the steering wheel 1 is removed, the force having acted on the gear 10n is removed. The output steering shaft 10b is rotated in the left-hand direction by the reaction force transmitted from the steering direction control unit 6. The gear 10l is rotated in the right-hand direction. In this case, since the axis of the gear 10l is aligned with that of the gear 10o, the gears 10o and 10l are rotated in the same direction. As a result, the input steering shaft 10a is rotated in the left-hand direction, and the steering wheel 1 returns to the initial position.

When the steering wheel 1 is rotated in the left-hand direction viewed from the driver, a left turn is performed in the opposite manner to the above description. The circuit for the second embodiment is substantially the same as that shown in FIG. 6, except that the sensor 11 comprises a noncontact type sensor.

According to the power steering apparatus of the present invention as described above, the motor is rotated in response to the output signal from the torque sensor, and the steering direction control apparatus is operated by the rotatational force of the motor. Unlike the conventional power steering apparatus, oil need not be used, thus simplifying the construction and decreasing the power consumption. In the conventional power steering apparatus, the motor rotation cannot properly follow quick turning of the steering wheel, a large sliding noise is generated, and reliability and sensitivity of steering torque detection are degraded. However, the power steering apparatus of the present invention solves all these conventional problems.

What is claimed is:

1. A vehicle power steering apparatus for performing power steering by rotating a motor in accordance with a steering torque acting on input and output steering shafts and driving a steering direction control unit to perform power steering, said apparatus comprising:

a support member;

a motor having a rotatable shaft;

a pair of support shafts coupled between said motor and said support member, one of said pair of support shafts being pivotably coupled to said support member to enable displacement of said other one of said pair of support shafts relative to said support member;

an input steering shaft;

an output steering shaft;

a torsion bar coupled between said input steering shaft and said output steering shaft;

a pair of gears coupled to said motor shaft at spaced locations, each of said pair of gears being coupled to a different one of said input and said output steering shafts;

a sensor for generating an electrical signal corresponding to a displacement of said other one of said pair of support shafts displaced by a rotational force acting on one of said input and output steering shafts, said sensor including a moveable member coupled to said other one of said support shafts;

a controller for rotating said motor at a torque represented by the electrical signal during an ON time of the electrical signal generated from said sensor; and moving means for moving said moveable member in a direction to cancel the displacement of said moveable member driven by said motor.

2. An apparatus according to claim 1, wherein said motor comprises a series DC motor.

3. An apparatus according to claim 1, wherein said movable member of said sensor slides along a single resistive element, one end of said movable member being coupled to said one of said at least two support shafts.

4. An apparatus according to claim 3 further comprising a rotational direction detector for detecting a rotational direction by detecting whether or not a potential difference between said movable member and one end of said resistive element is higher than a first reference value, and a rotational torque detector for detecting as the rotational torque a difference between a potential difference between said movable member and one end of said resistive element and a second reference value.

* * * * *